Jan. 13, 1953  H. J. HORN  2,625,439
VEHICLE WHEEL
Filed May 18, 1948

INVENTOR.
HARRY J. HORN
BY
Barnes, Kisselle, Laughlin & Raisch
ATTORNEYS.

Patented Jan. 13, 1953

2,625,439

UNITED STATES PATENT OFFICE 2,625,439

VEHICLE WHEEL

Harry J. Horn, Lansing, Mich., assignor to Motor Wheel Corporation, Lansing, Mich., a corporation of Michigan Application May 18, 1948, Serial No. 27,770

7 Claims. (Cl. 301—37)

This invention relates to a vehicle wheel and more particularly to a vehicle wheel constructed to have attached thereto a hub cap, wheel trim ring, wheel cover or the like.

It is an object of this invention to produce a vehicle wheel with a relatively inexpensive, simple, but highly efficient means for detachably securing a wheel cover thereto.

As used herein, the term "cover plate" will be used broadly to include hub cap, wheel trim ring or a wheel cover plate which covers the full body portion of the wheel.

More particularly the invention is concerned with the shearing and forming of three or more circumferentially spaced bosses in the wheel body which form retaining means for the wheel cover plate.

Figure 2:
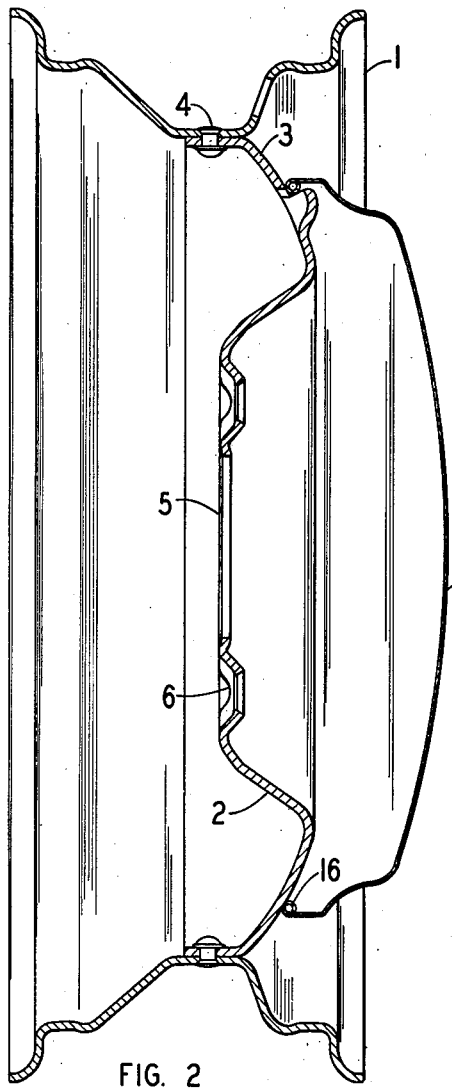
Fig. 2 is a diametrical section through the wheel along the line 2—2 of Fig. 1.

Referring more particularly to the drawings I have shown a metal vehicle wheel comprising rim 1, stamped metal disc body 2 having circumferentially spaced spoke sections 3 secured to the rim by rivets 4. The body 2 is provided with a central aperture 5 for the hub and an integral bolting-on flange 6.

The wheel body is provided with a plurality of equi-circumferentially spaced bosses 7. For purposes of description I have shown three of these bosses but more than three can be provided, if desired. Each boss is formed by making a shear 8 in the wheel body and pressing the metal adjacent to, and on the radially inner side of, the shear outwardly in the form of a partial bubble. Shear 8 has the form of a V with the apex 9 of the V positioned on a radius and the two sides 10 making less than a right angle with the radial line passing through the apex of the V. Each boss 7 is provided with an apex 11 and two diverging sides 12 which likewise form a V.

Figure 1:
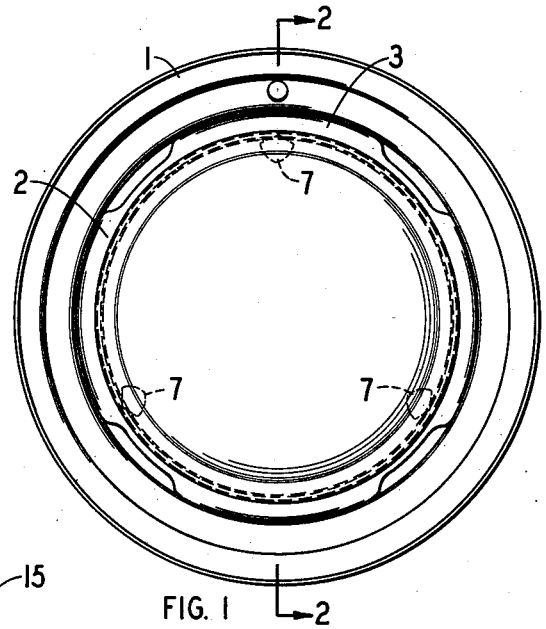
Fig. 1 is a side elevation showing my wheel with the cover plate attached thereto.
Figure 5:
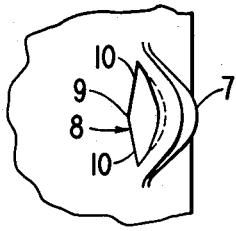
Fig. 5 is a fragmentary view of the wheel body carrying the sheared boss and looking in a radial direction toward the center of the wheel as indicated by the line 5—5 of Fig. 3.
Figure 4:
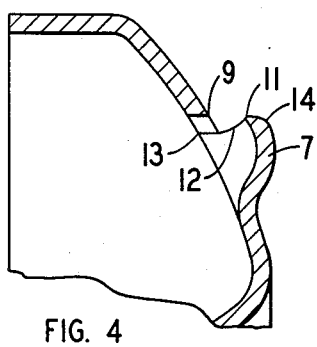
Fig. 4 is an enlarged fragmentary radial section similar to Fig. 2 but showing only one of the sheared bosses and the adjoining portion of the wheel body.
Figure 3:
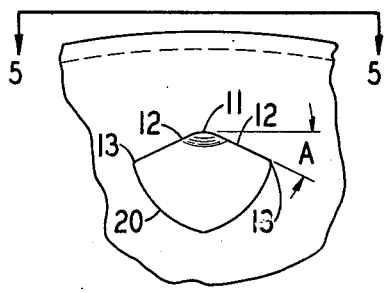
Fig. 3 is a fragmentary side elevation of a portion of the wheel carrying the sheared boss.

By referring to Figs. 1, 3 and 4 it will be noted that apex 11 of the boss 7 is positioned further away from the geometric center of the wheel than points 13 at which sides 12 merge into the body proper 2 of the wheel. In other words, sides 12 of boss 7 diverge from, and slope radially inwardly of, the wheel from apex 11. The angle A, which is included between side 12 and a line perpendicular to the radius passing through apex 11, can vary from a few degrees to a few degrees short of a right angle. An angle A of about 25° is preferred and has been found very satisfactory. Boss 7 is rounded in cross section, as shown in Fig. 4, and has the apex 11 rounded off as at 14 to facilitate assembly of the cover plate 15 thereto.

Boss 7 has its greatest width and depth between points 13 and tapers inwardly radially of the wheel body so that the junction line 20 between boss 7 and the wheel body forms a V opposed to V edge 11, 12.

Cover plate 15 is preferably a dished metal cover plate as shown and provided with a circumferentially beaded edge 16. The circumferential edge of cover plate 15 should extend radially inwardly and bead 16 is a convenient manner in which to form this edge inwardly so that it will interengage with bosses 7.

To mount the cover plate 15 on the wheel, the cover plate is placed with the bead 16 seated on faces 12 of two of the bosses 7, plate 15 is then pressed axially inwardly to force the bead over the other or third boss 7 so that the bead 16 interengages all of the bosses. The cover plate 15 is a spun or sheet metal plate and flexible enough to allow this operation. The rounded outer portion 14 of the apex 11 of each boss facilitates forcing of the beaded edge of the cover plate over the apex of each boss. In forcing bead 16 over the third boss, the bead will be temporarily flexed out of true round or circular form but a soon as the bead passes over apex 11 the inherent resilience of the bead will cause it to slide down the inclined surfaces or seats 12 as bead 16 tends to assume its normal round or circular shape, thus interengaging the beaded edge 16 of the plate 15 with all three bosses 7. Angular seats 12 in a sense form pockets into which the beaded edge of the cover plate drops.

The diameter of the circle passing through apices 11 will be substantially greater than the diameter of the circle passing through points 13. In practice this difference has been about a quarter of an inch. The diameter of the circle passing through points 13 will be slightly greater than the diameter of the beaded edge 16. Since the edges 12 are inclined radially inwardly, when the cover plate is snapped over the bosses 7, bead 16, which is thereby distorted out of true round, will, in again tending to assume its true round shape, slide down the inclined surfaces 12 until it strikes the wheel body. Bead 16 will remain distorted out of round a slight amount when the cover is fully in place which insures bead 16 being in tension and thereby holding the cover tightly on the wheel. Thus, due to the inclination of edges 12, the beaded edge of the cover plate is always in tension and thus maintains a tight rattle-proof fit between the cover plate and the wheel body.

The cover plate 15 is removed by prying the beaded edge radially and axially outward over the apex 11 of any one of the bosses 7 whereupon the cap can be radially removed from the wheel body.

I claim:

1. In a vehicle wheel body, a plurality of circumferentially spaced bosses adapted for detachably connecting a cover plate to the wheel body, said wheel body having a V shear for each boss, the metal radially inwardly of said V shear being formed axially outwardly of said shear in the form of a V boss with edge surfaces in the form of a V, the edge surfaces of each boss diverging from the apex toward the wheel body and inclining radially and axially inwardly from the apex toward the body proper and the apex of the boss being positioned radially a greater distance from the center of the wheel body than the points at which the edge surfaces meet with the body proper of the wheel.

2. The wheel body claimed in claim 1 wherein each boss has its greatest width at the circumference passing through the points of confluence of the edge surfaces of the V with the body proper, the junction of the boss and body proper being likewise in the form of a V with the apex opposed to the apex of the free edge of the boss.

3. In a vehicle wheel comprising a rim and a body portion, at least three circumferentially spaced bosses on said wheel body, each boss comprising a sheared portion having its free edge extending axially outwardly from the body of the wheel at an angle inclined towards the vertical plane of the wheel and in the form of a V with the sides of the free edges diverging radially inwardly and toward the wheel body, the apex of said V shaped free edge being positioned radially a greater distance from the center of the wheel than the sides of the V edge whereby when a cover plate is snapped over the plurality of bosses the edge of the cover plate interengages between and with the inclined V faces of each boss and the adjacent face portions of the wheel body.

4. The vehicle wheel claimed in claim 3 wherein each boss is in the form of a portion of a bubble having its center substantially in the plane of the adjacent body portion.

5. A vehicle wheel comprising a pressed metal body with a plurality of bosses sheared from said wheel body with the free edges of each boss in the form of a V, the free edges of each boss diverging and extending radially inwardly from the apex of the V toward and joining the body proper of said wheel at an angle inclined towards the vertical plane of the wheel, the said bosses being circumferentially spaced about said wheel body and positioned substantially equidistant from the center of the wheel body, and a flexible cover plate having an inwardly formed circumferential edge snapped over the bosses and resiliently interengage between and with the V edges of each of said bosses and the adjacent face portions of the wheel body, the diameter of the circle passing through the apices of said V bosses being greater than the diameter of the circle passing through the points of junction of the free edges of the bosses with the wheel body, the diameter of the circumferential edge of said cover plate being less than the diameter of the circle passing through the points of junction of the free edges of the bosses with the wheel body whereby when the cover plate is mounted over said bosses the free edges of the bosses upon which the edge of the cover plate seats cooperate to distort the edge of the cover plate out of round and thereby hold the edge of the cover plate in tension on said bosses.

6. The vehicle wheel claimed in claim 5 wherein the diameter of the circle passing through the apices of said bosses is greater than the inner diameter of the circumferential edge of said cover plate.

7. The vehicle wheel claimed in claim 5 wherein the circumferential edge of the cover plate is in the form of a bead, the portion of said cover adjacent said bead being spaced from said V edges of said bosses.

HARRY J. HORN.

REFERENCES CITED

The following references are of record in the file of this patent:

UNITED STATES PATENTS

| Number | Name | Date |
|---|---|---|
| 2,020,885 | Gatta | Nov. 12, 1935 |
| 2,085,647 | Freeman | June 29, 1937 |
| 2,293,067 | Lyon | Aug. 18, 1942 |
| 2,308,615 | Lyon | Jan. 19, 1943 |

FOREIGN PATENTS

| Number | Country | Date |
|---|---|---|
| 456,866 | Great Britain | Nov. 17, 1936 |